(12) United States Patent
Lu et al.

(10) Patent No.: US 11,634,227 B2
(45) Date of Patent: Apr. 25, 2023

(54) LANDING TRACKING CONTROL METHOD AND SYSTEM BASED ON LIGHTWEIGHT TWIN NETWORK AND UNMANNED AERIAL VEHICLE

(71) Applicant: Guangdong University of Technology, Guangzhou (CN)

(72) Inventors: Renquan Lu, Guangzhou (CN); Yong Xu, Guangzhou (CN); Hongxia Rao, Guangzhou (CN); Chang Liu, Guangzhou (CN); Hui Chen, Guangzhou (CN); Yongmin Luo, Guangzhou (CN); Hui Peng, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/584,563

(22) Filed: Jan. 26, 2022

(65) Prior Publication Data
US 2022/0332415 A1   Oct. 20, 2022

(30) Foreign Application Priority Data
Apr. 20, 2021   (CN) .......................... 202110426555.2

(51) Int. Cl.
*G06T 7/73*  (2017.01)
*G06V 20/40*  (2022.01)
(Continued)

(52) U.S. Cl.
CPC ........... *B64C 39/024* (2013.01); *G05D 1/042* (2013.01); *G06T 7/246* (2017.01); *G06T 7/277* (2017.01);
(Continued)

(58) Field of Classification Search
CPC .... G06V 10/70; G06V 10/764; G06V 10/766; G06V 10/77; G06V 10/7715;
(Continued)

(56) References Cited

U.S. PATENT DOCUMENTS

2021/0319420 A1* 10/2021 Yu et al. .............. G06Q 20/322
2021/0406548 A1* 12/2021 Zhang et al. .......... G06V 20/41

FOREIGN PATENT DOCUMENTS

| CN | 112200870 A | 1/2021 |
| CN | 112598066 A | 4/2021 |

OTHER PUBLICATIONS

CN 202110426555.2—Notification of Granting Patent Right to the Invention, dated Nov. 17, 2021, 3 pages. (with English translation).
(Continued)

*Primary Examiner* — Andrew W Johns
(74) *Attorney, Agent, or Firm* — Getech Law LLC; Jun Ye

(57) ABSTRACT

A landing tracking control method comprises the following contents: a tracking model training stage and an unmanned aerial vehicle real-time tracking stage. The landing tracking control method extracts a network Snet by using a lightweight feature and makes modification, so that an extraction speed of the feature is increased to better meet a real-time requirement. Weight allocation on the importance of channel information is carried out to differentiate effective features more purposefully and utilize the features, so that the tracking precision is improved. In order to improve a training effect of the network, a loss function of an RPN network is optimized, a regression precision of a target frame is measured by using CIOU, and meanwhile, calculation of classified loss function is adjusted according to CIOU, and a relation between a regression network and classification network is enhanced.

3 Claims, 4 Drawing Sheets

(51) Int. Cl.
    *B64C 39/02*     (2023.01)
    *G06T 7/246*     (2017.01)
    *G06T 7/277*     (2017.01)
    *G06V 20/17*     (2022.01)
    *G06V 10/774*     (2022.01)
    *G06V 10/80*     (2022.01)
    *G06V 10/77*     (2022.01)
    *G06V 10/764*     (2022.01)
    *G06V 10/766*     (2022.01)
    *G05D 1/04*     (2006.01)
    *G06T 7/60*     (2017.01)

(52) U.S. Cl.
    CPC ............... *G06T 7/60* (2013.01); *G06T 7/73* (2017.01); *G06V 10/764* (2022.01); *G06V 10/766* (2022.01); *G06V 10/7715* (2022.01); *G06V 10/7747* (2022.01); *G06V 10/806* (2022.01); *G06V 20/17* (2022.01); *G06V 20/41* (2022.01); *G06V 20/46* (2022.01); *B64U 2201/00* (2023.01); *G06T 2207/10016* (2013.01); *G06T 2207/10032* (2013.01); *G06T 2207/20081* (2013.01); *G06V 2201/07* (2022.01)

(58) Field of Classification Search
    CPC ............. G06V 10/774; G06V 10/7747; G06V 10/776; G06V 10/778; G06V 10/7796; G06V 10/806; G06V 10/82; G06V 20/17; G06T 7/246; G06T 7/248; G06T 7/277; G06T 7/73; G06T 7/74; G06T 2207/20081; G06T 2207/20084
    See application file for complete search history.

(56) References Cited

OTHER PUBLICATIONS

CN 202110426555.2—First Office Action, dated Aug. 31, 2021, 5 pages.
CN 202110426555.2—Supplemental Search Report, dated Nov. 8, 2021, 1 page.

\* cited by examiner

LANDING TRACKING CONTROL METHOD AND SYSTEM BASED ON LIGHTWEIGHT TWIN NETWORK AND UNMANNED AERIAL VEHICLE

TECHNICAL FIELD

The present invention relates to the field of control of unmanned aerial vehicles, in particular to a landing tracking control method and system based on a lightweight twin network and an unmanned aerial vehicle.

BACKGROUND

Conventional tracking algorithms primarily based on mean shift, optical flow, particle filtering and the like are high in tracking velocity, but cannot utilize deep features of images, so that they are relatively poor in tracking precision. At present, mainstream tracking algorithms are primarily based on deep learning, related filtering and combination thereof. The tracking algorithms based on deep learning extract image features better by utilizing convolutional networks, are high in tracking precision, but are large in calculating amount of networks and time-consuming, and it is hard to meet a real-time demand. The velocities of the tracking algorithms based on related filtering exceed those of the former greatly, and can meet the real-time demand. However, as it is necessary to update a filter template online in real time for the related filter tracker, errors will be accumulated, so that the tracking effect is poorer and poorer and long-term tracking cannot be maintained. By combining deep learning with related filtering, they have complementary advantages to a certain extent. Although there is a well balance on precision and velocity, the tracking effect is stilled to be improved. Later, algorithms based on twin networks have been applied to the tracking field, for example, SiamRPN++, to position and track an object from a similarly matched angle, and the performance of the algorithms exceed algorithms based on combination of deep learning and related filtering in the past. A backbone network of SiamRPN++ is ResNet-50, is deeper, needs more calculating resources and is long in time, which is unfavorably applied to embedded platforms such as an unmanned aerial vehicle. Different tracked objects have different responses in different channels of a feature pattern, and information of each channel utilized equally without being differentiated goes against a tracking task. When a feature extraction network is shallower, in order to utilize feature information better, a proper feature enhancing mode shall be adopted to fuse shallow features with deep features. A conventional local region search policy is too simple. When the target disappears transiently as a result of shelter or other factors, it is hard to re-position the target. When the target appears again, it is probable that the target has run out of a searched region. In addition, a classification network and a regression network thereof are trained independently, and a loss function corresponding to training is short of a related correlation.

SUMMARY

Aiming at the above-mentioned defects, the objective of the present invention provides a landing tracking control method and system based on a lightweight twin network and an unmanned aerial vehicle. According to the landing tracking control method, the missing target is re-positioned and it is ensured that the target is still in the currently searched region when appearing again, so that the tracking precision and the control response speed of the landing process of the unmanned aerial vehicle can be improved.

In order to achieve the objective, the present invention adopts a technical scheme as follows:

A landing tracking control method and system based on A lightweight twin network includes the following contents:

in a tracking model training stage: a1. Extracting a target image in a target template, and extracting a search image in a search area; inputting the target image and the search image into two same lightweight SNet feature extraction modules, and extracting a search feature and a target feature by using a lightweight network SNet in the lightweight SNet feature extraction modules; a2. Adjusting weights of the search feature and the target feature by a feature weight adjusting module to obtain an adjusted search feature and an adjusted target feature; a3. Inputting the adjusted search feature and the adjusted target feature into an enhanced feature module to obtain an enhanced search feature and an enhanced target feature by a feature enhancing operation; a4. Inputting the enhanced search feature and the enhanced target feature into a same RPN network to determine a type and a position of a target; a5. Measuring a regression precision of a target frame by using CIOU, wherein when a CIOU value is relatively great, that is, the target frame is positioned precisely; and as far as a sample with a high frame precision is concerned, a classification loss value and a frame loss value thereof are increased, and otherwise, the classification loss value and the frame loss value thereof are decreased; and a6. Carrying out multiple circuit training according to steps a5-a2-a5 to finally obtain a tracking model; and in an unmanned aerial vehicle real-time tracking stage, b1. Carrying out frame identifying operation on a camera carried by the unmanned aerial vehicle; b2. Introducing frame identifying information into the tracking model and identifying a target; and b3. Judging whether the target is positioned successfully or not, if so, carrying out forecasting search on the target by means of Kalman algorithm and returning to the step b1 to operate; and if not, adjusting and expanding the search range and returning to the step b1 to operate.

More preferably, in the step a1, after a deep separated convoluting operation of the lightweight network SNet, three search features and three target features are obtained.

Specifically, the weight adjusting operation in the step a2 includes the following contents: compressing a feature pattern by the search feature and the target feature by utilizing global max-pooling first; then training a stipulated parameter to represent weight of each channel feature pattern then via full convolutional and nonlinear activation operations, and finally, multiplying features of original channels by weight values obtained by the full convolutional and nonlinear activation operations to obtain an adjusted search feature pattern and an adjusted target feature pattern.

More preferably, the steps a3 and a4 further include the following contents: enhancing the extracted adjusted search feature and the adjusted target feature based on a feature pyramid, carrying out feature fusion, and inputting the fused feature into the RPN network to determine the type and the position of the target from three dimensions.

More preferably, the step a5 further includes the following contents:

For an optimization problem of the loss function, measuring a regression accuracy of the target frame by using CIOU, wherein when the CIOU value is relatively great, it is indicated that the target frame is positioned precisely; and as far as a sample with a high frame precision is concerned, the classification loss value and the frame loss value thereof are increased, and otherwise, the classification loss value and the frame loss value thereof are decreased.

Specifically, IOU in the CIOU is specifically as follows:

$$IOU = \frac{|A \cap b|}{|A \cup b|}$$

$$a = \frac{v}{1 - IOU + v}$$

$$v = \frac{4}{\pi^2}\left(\arctan\frac{w^{gt}}{h^{gt}} - \arctan\frac{w}{h}\right)^2 \quad (3)$$

$$CIOU = IOU - \frac{\rho^2(b, b^{gt})}{c^2} - a*v \quad (4)$$

$$Loss_b = 1 - C_{IOU} \quad (5)$$

$$Loss_c = -[g*\ln p + (1-g)*\ln(1-p)] \quad (6)$$

$$p = Pre_{object} + C_{IOU}*(1 - Pre_{object}) \quad (7)$$

A represents a true frame, B represents a prediction frame, w, h, b, $w^{gt}$, $h^{gt}_{and}$ $b^{gt}$ respectively represent widths, heights and centers of the true frame and the prediction frame, $\rho^2(b,b_{gt})$ represents an Euclidean distance between the center points of the true frame and prediction frame, c represents a diagonal length of the minimum rectangle containing the true frame and prediction frame true frame and prediction frame, $Loss_b$ represents a frame loss function, $Loss_c$ represents a classification loss function, g represents whether it is the target or not, if so, it is 1, and if not, it is 0; $Pre_{object}$ represents a classification probability predicted by the RPN network, and when the regression precision of the prediction frame is high, it is considered that classification is relatively reliable, and the classification prediction probability thereof is increased.

More preferably, the step b3 further includes the following contents: for a re-positioning problem after the target disappears, predicting a next frame position of the target by using Kalman algorithm, and locally detecting the target by taking a prediction result as a center; if the target tracking in some continuous frames are missing, adding one of the length and width of the search area additionally by taking the prediction position result of Kalman filtering as a center, wherein the item is increased along with increment of time before the length and width of the search area exceed a video frame itself, and if the target is not detected for a long time, a final detection area is expanded to a whole image.

Specifically, the step b3 further includes the following contents:

$$w_{search} = w_{pre} + a*v_w*t*\left(\frac{w_{frame} - w_{pre}}{v_w}\right) \quad (8)$$

$$h_{search} = h_{pre} + a*v_h*t*\left(\frac{h_{frame} - h_{pre}}{v_h}\right) \quad (9)$$

$w_{search}$ and $h_{search}$ are width and height of the search area, $w_{pre}$ and $h_{pre}$ are width and height of a Kalman prediction area, $w_{frame}$, $h_{frame}$ are width and height of the video frame, $v_w$ and $v_h$ are Kalman average moving speeds in transverse and longitudinal directions of the target in a previous n frame image, a is a constant that controls an area expanding speed, and t is a video frame number counted from start of tracking loss.

A landing tracking control system includes a tracking model and a real-time tracking apparatus.

the tracking model includes: a lightweight SNet feature module for facilitating a search feature pattern and a target feature pattern of the lightweight network SNet; a feature weight adjusting module for adjusting weights of the search feature pattern and the target feature pattern to obtain an adjusted search feature pattern and an adjusted target feature pattern; an enhanced feature module for carrying out a feature enhancing operation on the adjusted search feature pattern and the adjusted target feature pattern to obtain an enhanced search feature pattern and an enhanced target feature pattern; an RPN module configured with an RPN network, for determining a type and a position of the target; and a CIOU loss module for measuring a regression precision of the target frame.

The real-time tracking apparatus includes: a camera carried by the unmanned aerial vehicle for shooting a video of the camera carried by the unmanned aerial vehicle; a video identifying module for carrying out frame identifying operation on the camera carried by the unmanned aerial vehicle; a tracking identifying module, configured with a control software for the landing tracking control method of the above-mentioned unmanned aerial vehicle; a judging module for judging whether the target is positioned successfully or not; a prediction searching module for carrying out prediction search on the target by using Kalman algorithm when the judging module judges that the target is positioned successfully; and a search expanding module for adjusting a search expanding scope when the judging module judges that the target is not positioned successfully.

An unmanned aerial vehicle applies the above-mentioned landing tracking control system.

An embodiment of the present invention has the beneficial effects:

according to the content, the present invention provides a landing tracking control method based on a lightweight twin network. The landing tracking control method extracts a network Snet by using a lightweight feature and makes modification, so that an extraction speed of the feature is increased to better meet a real-time requirement. For fixed point landing of the unmanned aerial vehicle, a taking off and landing platform is usually fixed, that is, the tracking task can be divided into tracking of a single target. A same type of targets is usually represented by a special feature channel. Therefore, a module is designed to allocate the importance of channel information to differentiate effective features more purposefully and utilize the features, so that the tracking precision is improved. In order to improve a training effect of the network, a loss function of a (Region Proposal Network) RPN network is optimized, a regression precision of a target frame is measured by using (Complete-IOU) CIOU, and meanwhile, calculation of classified loss function is adjusted according to CIOU, and a relation between a regression network and classification network is enhanced. In a tracking process, when the target is missing as a result of a certain reason, the algorithm can still expand the search region gradually as time lapses according to the previous moving rule of the target, so that it is further ensured that the target is still in the currently searched region when appearing again.

DETAILED DESCRIPTION

Figure 1:
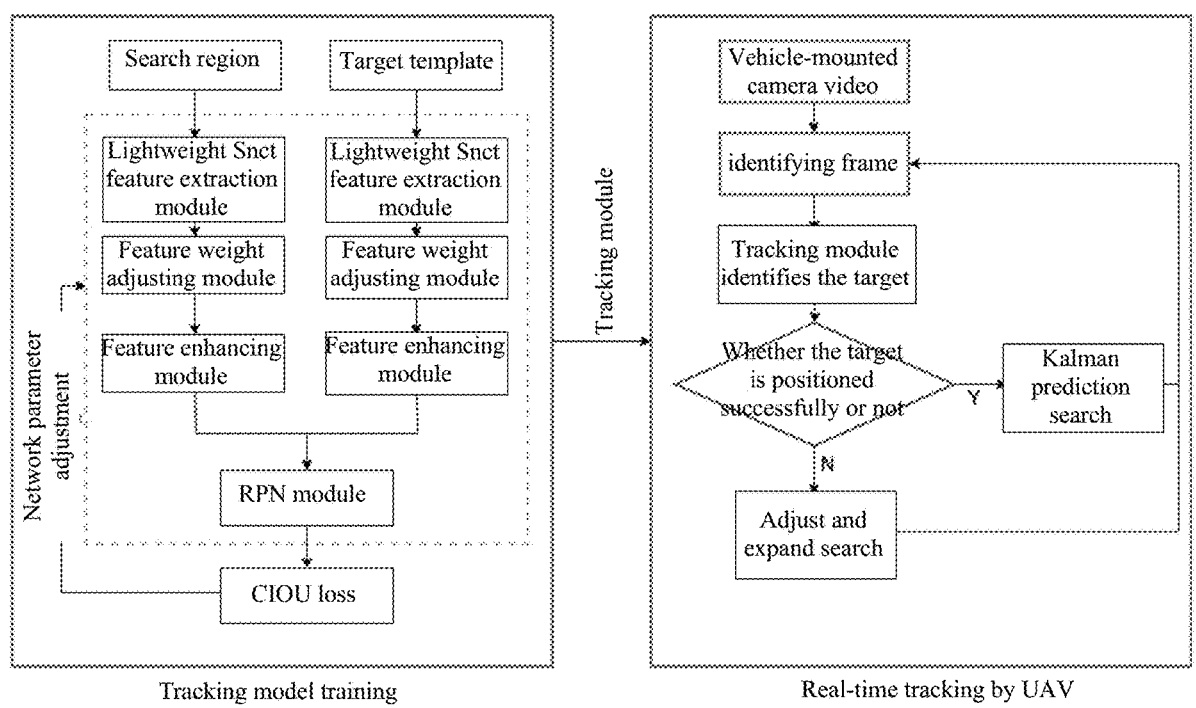
FIG. 1 is a workflow schematic diagram of a landing tracking control system in an embodiment of the invention.

The technical scheme of the present invention is further described through specific embodiments in combination with the drawings.

It is to be noted that the terms used herein are merely to describe specific implementation modes rather than being intended to limit the exemplary implementation modes according to the application. As used herein, unless otherwise specified in the context, the singular form is further intended to include plural form. In addition, it is to be further understood that when the terms "comprise" and/or "include" are used in the description, it indicates that there are features, steps, operations, apparatuses, assemblies and/or their combinations.

Unless otherwise specified, relative arrangement, digital expression formulae and numerical values of components and steps illustrated in these embodiments do not limit the scope of the present invention. Meanwhile, it shall be understood that for the convenience of description, sizes of parts shown in the drawings are not drawn according to an actual proportional relationship. Techniques, methods and devices known to those skilled in the prior art may not be discussed in detail. But in a proper circumstance, the techniques, methods and devices shall be regarded as a part of the description. In all the illustrated and discussed examples, any specific value shall be explained as be exemplary merely rather than be restrictive. Thus, other examples of exemplary embodiments may have different values. It is to be noted that similar mark numbers and letters represent similar items in the drawings below, such that once a certain item is defined in a drawing, it is unnecessary to further discuss it in the subsequent drawings.

A landing tracking control method and system based on A lightweight twin network includes the following contents:

in a tracking model training stage: a1. A target image is extracted in a target template, and a search image is extracted in a search area; the target image and the search image are input into two same lightweight SNet feature extraction modules, and a search feature and a target feature are extracted by using a lightweight network SNet in the lightweight SNet feature extraction modules; a2. Weights of the search feature and the target feature are adjusted by a feature weight adjusting module to obtain an adjusted search feature and an adjusted target feature; a3. The adjusted search feature and the adjusted target feature are input into an enhanced feature module to obtain an enhanced search feature and an enhanced target feature by a feature enhancing operation; a4. The enhanced search feature and the enhanced target feature are input into a same RPN network to determine a type and a position of a target; a5. A regression precision of a target frame is measured by using CIOU, wherein when a CIOU value is relatively great, that is, the target frame is positioned precisely, and as far as a sample with a high frame precision is concerned, a classification loss value and a frame loss value thereof are increased, and otherwise, the classification loss value and the frame loss value thereof are decreased; and a6. Multiple circuit training is carried out according to steps a5-a2-a5 to finally obtain a tracking model; and in an unmanned aerial vehicle real-time tracking stage, b1. Frame identifying operation is carried out on a camera carried by the unmanned aerial vehicle; b2. Frame identifying information is introduced into the tracking model and identifying a target; and b3. Whether the target is positioned successfully or not is judged, if so, forecasting search is carried out on the target by means of Kalman algorithm and returning to the step b1 to operate; and if not, the search range is adjusted and expanded and it is returned to the step b1 to operate.

Figure 2:
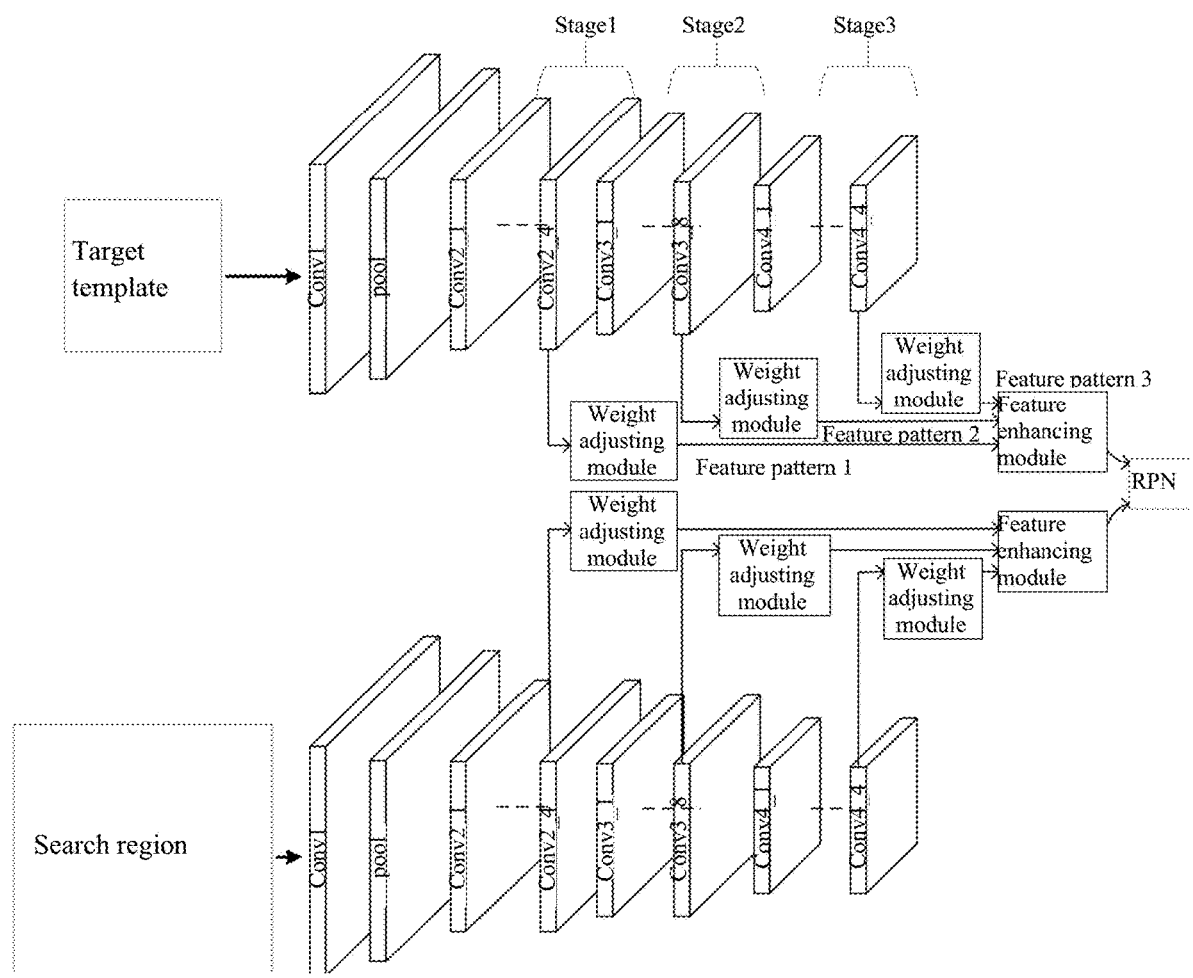
FIG. 2 is a schematic diagram of a frame structure of a part of algorithm in the tracking model training stage in an embodiment of the present invention.

For the real-time demand in tracking by the unmanned aerial vehicle, feature extraction on the image by using the modified lightweight network SNet. In order to aim at a specific target better, that is, track the taking off and landing platform, the original network is modified now, and the modified network is as shown in FIG. 2.

Specifically, in the step a1, after a deep separated convoluting operation of the lightweight network SNet, three search features and three target features are obtained.

By taking a feature extraction network as an example, assuming that the size of the input image is 448*448, the feature extraction network of the lightweight network Snet is shown in a table below:

|  | OutputSize | Layer |
|---|---|---|
| Input | 448*448 | Image |
| Conv1 | 224*224 | 3*3, 24, s2 |
| Pool | 112*112 | 3*3maxpool, s2 |
| Stage1 | 56*56 | [132, s2] |
|  | 56*56 | [132, s1]*3 |
| Stage2 | 28*28 | [264, s2] |
|  | 28*28 | [264, s1]*7 |
| Stage3 | 14*14 | [528, s2] |
|  | 14*14 | [528, s1]*3 |

Through deep separable convolution, multiple channels can be obtained. Information carried by each channel is nearly decoupled. When related operations are carried out, a same type of objects only has high response in corresponding channels. For single type tracking, the target can be detected better by utilizing the corresponding channels precisely, so that the detection precision can be improved.

Figure 3:
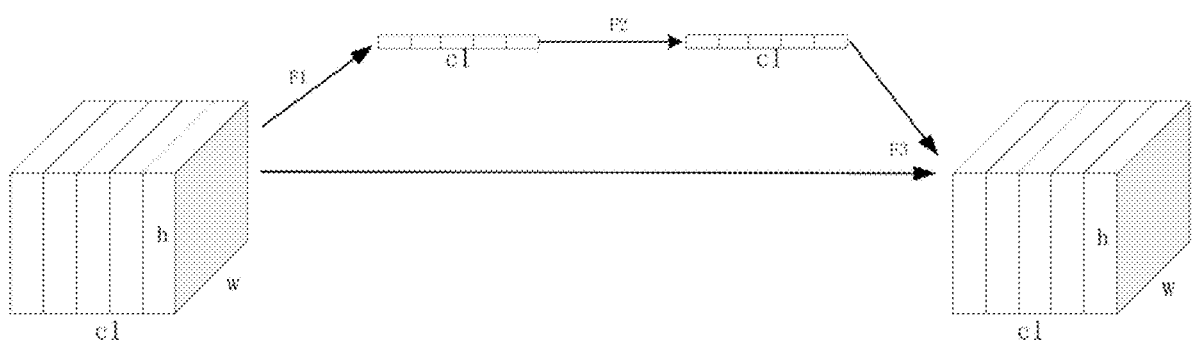
FIG. 3 is a weight adjusting operating low schematic diagram of the feature weight adjusting module in an embodiment of the present invention.

The weight adjusting operation in the step a2 includes the following contents: a feature pattern is compressed by the search feature and the target feature by utilizing global max-pooling first; then a stipulated parameter is trained to represent weight of each channel feature pattern then via full convolutional and nonlinear activation operations, and finally, features of original channels are multiplied by weight values obtained by the full convolutional and nonlinear activation operations to obtain an adjusted search feature pattern and an adjusted target feature pattern. Specifically, as shown in FIG. 3, F1 represents that the feature pattern is compressed by global maximum pooling, F2 represents operations such as full convolution and nonlinear activation, a W parameter is trained to represent the weight of each channel feature pattern, and F3 represents that the feature of the original channel is multiplied with the weight value obtained by F2 to obtain the adjusted feature pattern.

The shallow feature after image convolution reflects shape, color, edge and the like much, which is favorable to position the target. The deep feature usually has semantic information of higher layer, which is favorable to classify the target. The shallow feature and the deep feature are fused to utilize information represented by both of them at the same time more efficiently.

Figure 4:
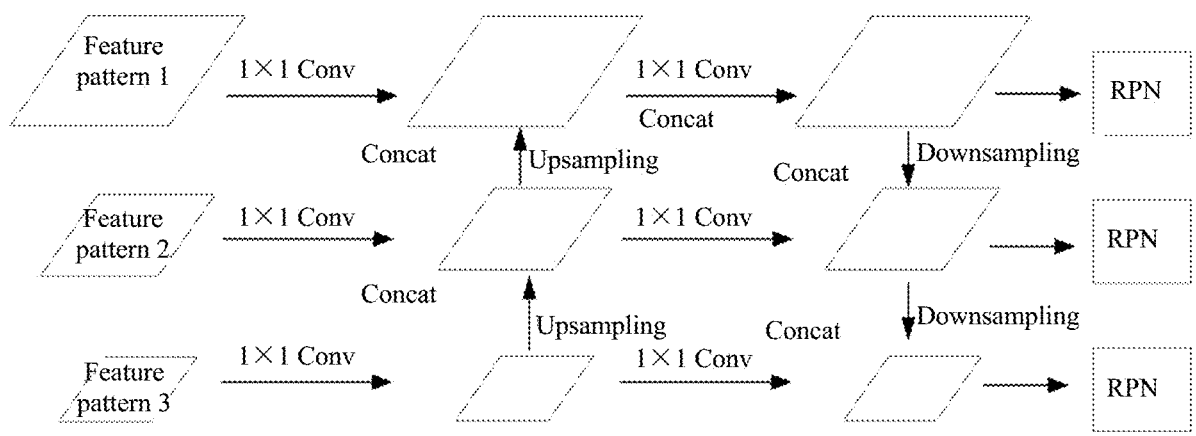
FIG. 4 is a feature enhancing operating flow schematic diagram of the enhancing feature module in an embodiment of the present invention.

Specifically, the steps a3 and a4 further comprise the following contents: enhancing the extracted adjusted search feature and the adjusted target feature based on a feature pyramid, carrying out feature fusion, and inputting the fused feature into the RPN network to determine the type and the position of the target from three dimensions; and the workflow of the feature enhancing module is as shown in FIG. 4.

More preferably, the Step a5 further includes the following contents: for an optimization problem of the loss function, the performance of the trained network is greatly related to setting of the loss function; a regression accuracy of the target frame is measured by using CIOU, wherein when the CIOU value is relatively great, it is indicated that the target frame is positioned precisely; and as far as a sample with a high frame precision is concerned, the classification loss value and the frame loss value thereof are increased, and otherwise, the classification loss value and the frame loss value thereof are decreased.

Specifically, IOU in the CIOU is specifically as follows:

$$IOU = \frac{|A \cap b|}{|A \cup b|}$$

$$a = \frac{v}{1 - IOU + v}$$

$$v = \frac{4}{\pi^2} \left( \arctan \frac{w^{gt}}{h^{gt}} - \arctan \frac{w}{h} \right)^2 \quad (3)$$

$$CIOU = IOU - \frac{\rho^2(b, b^{gt})}{c^2} - a*v \quad (4)$$

$$Loss_b = 1 - C_{IOU} \quad (5)$$

$$Loss_c = -[g*\ln p + (1-g)*\ln(1-p)] \quad (6)$$

$$p = Pre_{object} + C_{IOU} * (1 - Pre_{object}) \quad (7)$$

A represents a true frame, B represents a prediction frame, w, h, b, $w^{gt}$, $h^{gt}$ and $b^{gt}$ respectively represent widths, heights and centers of the true frame and the prediction frame, $\rho^2(b,b^{gt})$ represents an Euclidean distance between the center points of the true frame and prediction frame, c represents a diagonal length of the minimum rectangle containing the true frame and prediction frame true frame and prediction frame, $Loss_b$ represents a frame loss function, $Loss_c$ represents a classification loss function, g represents whether it is the target or not, if so, it is 1, and if not, it is 0; $Pre_{object}$ represents a classification probability predicted by the RPN network, and when the regression precision of the prediction frame is high, it is considered that classification is relatively reliable, and the classification prediction probability thereof is increased.

More preferably, the step b3 further includes the following contents: for a re-positioning problem after the target disappears, predicting a next frame position of the target by using Kalman algorithm, and locally detecting the target by taking a prediction result as a center; if the target tracking in some continuous frames are missing, adding one of the length and width of the search area additionally by taking the prediction position result of Kalman filtering as a center, wherein the item is increased along with increment of time before the length and width of the search area exceed a video frame itself, and if the target is not detected for a long time, a final detection area is expanded to a whole image.

Specifically, $$w_{search} = w_{pre} + a*v_w*t*\left(\frac{w_{frame} - w_{pre}}{v_w}\right) \quad (8)$$

$$h_{search} = h_{pre} + a*v_h*t*\left(\frac{h_{frame} - h_{pre}}{v_h}\right) \quad (9)$$

$w_{search}$ and $h_{search}$ are width and height of the search area, $w_{pre}$ and $h_{pre}$ are width and height of a Kalman prediction area, $w_{frame}$, $h_{frame}$ are width and height of the video frame, $v_w$ and $v_h$ are Kalman average moving speeds in transverse and longitudinal directions of the target in a previous n frame image, a is a constant that controls an area expanding speed, and t is a video frame number counted from start of tracking loss.

A landing tracking control system applying the landing tracking control method includes a tracking model and a real-time tracking apparatus.

Specifically, the tracking model includes: a lightweight SNet feature module for facilitating a search feature pattern and a target feature pattern of the lightweight network SNet; a feature weight adjusting module for adjusting weights of the search feature pattern and the target feature pattern to obtain an adjusted search feature pattern and an adjusted target feature pattern; an enhanced feature module for carrying out a feature enhancing operation on the adjusted search feature pattern and the adjusted target feature pattern to obtain an enhanced search feature pattern and an enhanced target feature pattern; an RPN module configured with an RPN network, for determining a type and a position of the target; and a CIOU loss module for measuring a regression precision of the target frame.

The real-time tracking apparatus includes: a camera carried by the unmanned aerial vehicle for shooting a video of the camera carried by the unmanned aerial vehicle; a video identifying module for carrying out frame identifying operation on the camera carried by the unmanned aerial vehicle; a tracking identifying module, configured with a control software for the landing tracking control method; a judging module for judging whether the target is positioned successfully or not; a prediction searching module for carrying out prediction search on the target by using Kalman algorithm when the judging module judges that the target is positioned successfully; and a search expanding module for adjusting a search expanding scope when the judging module judges that the target is not positioned successfully.

An unmanned aerial vehicle applies the above-mentioned landing tracking control system.

In considering the real-time demand of tracking by the unmanned aerial vehicle, the unmanned aerial vehicle takes another more lightweight network as the feature extraction network. For the tracking task of the single type of objects, a feature weight adjusting module is designed. The feature channel with greater response is found by network training and is allocated with a larger weight value, so that the feature information is utilized more efficiently. The extracted feature is enhanced based on a feature pyramid, so that multi-dimensional target detection is carried out by inputting the feature into the RPN network. The loss function for classification and frame regression is optimized to enhance relation between the two. A policy of adjusting the search region based on a target moving rule is designed to help re-positioning of the target missing tracking.

According to the specific implementation mode, the present invention provides a landing tracking control method and system based on a lightweight twin network and an unmanned aerial vehicle. The landing tracking control method extracts a network Snet by using a lightweight feature and makes modification, so that an extraction speed of the feature is increased to better meet a real-time requirement. For fixed point landing of the unmanned aerial vehicle, a taking off and landing platform is usually fixed, that is, the tracking task can be divided into tracking of a single target. A same type of targets is usually represented by a special feature channel. Therefore, a module is designed to allocate the importance of channel information to differentiate effective features more purposefully and utilize the features, so that the tracking precision is improved. In order to improve a training effect of the network, a loss function of a (Region Proposal Network) RPN network is optimized, a regression precision of a target frame is measured by using (Complete-IOU) CIOU, and meanwhile, calculation of classified loss function is adjusted according to CIOU, and a relation between a regression network and classification network is enhanced. In a tracking process, when the target is missing as a result of a certain reason, the algorithm can still expand the search region gradually as time lapses according to the previous moving rule of the target, so that it is further ensured that the target is still in the currently searched region when appearing again.

The technical principle of the present invention is described in combination with the above-mentioned specific embodiments. The descriptions are merely to explain the principle of the present invention rather than being explained to limit the protective scope of the present invention in any form. Based on explanation herein, those skilled in the art may be associated with other specific implementation modes of the present invention without creative efforts, and these implementation modes shall fall into the protective scope of the present invention.

What is claimed is:

1. A landing tracking control method based on a lightweight twin network, the method comprising the following contents:

in a tracking model training stage:

a1. Extracting a target image in a target template, and extracting a search image in a search area; inputting the target image and the search image into two same lightweight SNet feature extraction modules, and extracting a search feature and a target feature by using a lightweight network SNet in the lightweight SNet feature extraction modules;

a2. Adjusting weights of the search feature and the target feature by a feature weight adjusting module to obtain an adjusted search feature and an adjusted target feature;

a3. Inputting the adjusted search feature and the adjusted target feature into an enhanced feature module to obtain an enhanced search feature and an enhanced target feature by a feature enhancing operation;

a4. Inputting the enhanced search feature and the enhanced target feature into a same RPN network to determine a type and a position of a target;

a5. Measuring a regression precision of a target frame by using CIOU, wherein when a CIOU value is relatively great indicating that the target frame is positioned precisely; and as far as a sample with a high frame precision is concerned, a classification loss value and a frame loss value thereof are increased, and otherwise, the classification loss value and the frame loss value thereof are decreased; and a6. Carrying out multiple circuit training to finally obtain a tracking model; and in an unmanned aerial vehicle real-time tracking stage, b1. Carrying out frame identifying operation on a camera carried by the unmanned aerial vehicle;

b2. Introducing frame identifying information into the tracking model and identifying a target; and b3. Judging whether the target is positioned successfully or not, if so, carrying out forecasting search on the target by means of Kalman algorithm and returning to the step b1 to operate; and if not, adjusting and expanding the search range and returning to the step b1 to operate;

wherein in the step a1, after a deep separated convoluting operation of the lightweight network SNet, three search features and three target features are obtained;

the weight adjusting operation in the step a2 comprises the following contents: compressing a feature pattern by the search feature and the target feature by utilizing global max-pooling first; then training a set of stipulated parameters to represent weight of a channel feature pattern then via full convolutional and nonlinear activation operations, and finally, multiplying features of original channels by weight values obtained by the full convolutional and nonlinear activation operations to obtain an adjusted search feature pattern and an adjusted target feature pattern;

the steps a3 and a4 further comprise the following contents: enhancing the extracted adjusted search feature and the adjusted target feature based on a feature pyramid, carrying out feature fusion, and inputting the fused feature into the RPN network to determine the type and the position of the target from three dimensions;

the step a5 further comprises the following contents:

For an optimization problem of the loss function, measuring a regression accuracy of the target frame by using CIOU, wherein when the CIOU value is relatively great, it is indicated that the target frame is positioned precisely; and as far as a sample with a high frame precision is concerned, the classification loss value and the frame loss value thereof are increased, and otherwise, the classification loss value and the frame loss value thereof are decreased;

IOU in the CIOU is specifically as follows:

$$IOU = \frac{|A \cap b|}{|A \cup b|}$$

$$a = \frac{v}{1 - IOU + v}$$

$$v = \frac{4}{\pi^2}\left(\arctan\frac{w^{gt}}{h^{gt}} - \arctan\frac{w}{h}\right)^2 \quad (3)$$

$$CIOU = IOU - \frac{\rho^2(b, b^{gt})}{c^2} - a*v \quad (4)$$

$$Loss_b = 1 - C_{IOU} \quad (5)$$

$$Loss_c = -[g*\ln p + (1-g)*\ln(1-p)] \quad (6)$$

$$p = Pre_{object} + C_{IOU}*(1 - Pre_{object}), \quad (7)$$

wherein A represents a true frame, B represents a prediction frame, w, h, b, $w^{gt}$, $h^{gt}$ and $b^{gt}$ respectively represent widths, heights and centers of the true frame and the prediction frame, $\rho^2(b,b^{gt})$ represents an Euclidean distance between the center points of the true frame and prediction frame, c represents a diagonal length of the minimum rectangle containing the true frame and prediction frame true frame and prediction frame, $Loss_b$ represents a frame loss function, $Loss_c$ represents a classification loss function, g represents whether it is the target or not, if so, it is 1, and if not, it is 0; $Pre_{object}$ represents a classification probability predicted by the RPN network, and when the regression precision of the prediction frame is high, it is considered that classification is relatively reliable, and the classification prediction probability thereof is increased;

the step b3 further comprises the following contents: for a re-positioning problem after the target disappears, predicting a next frame position of the target by using Kalman algorithm, and locally detecting the target by taking a prediction result as a center; if the target tracking in some continuous frames are missing, adding one of the length and width of the search area additionally by taking the prediction position result of Kalman filtering as a center, wherein the item is increased along with increment of time before the length and width of the search area exceed a video frame itself, and if the target is not detected for a long time, a final detection area is expanded to a whole image; and the step b3 further comprises the following contents:

$$w_{search} = w_{pre} + a * v_w * t * \left(\frac{w_{frame} - w_{pre}}{v_w}\right) \quad (8)$$

$$h_{search} = h_{pre} + a * v_h * t * \left(\frac{h_{frame} - h_{pre}}{v_h}\right) \quad (9)$$

$w_{search}$ and $h_{search}$ are width and height of the search area, $w_{pre}$ and $h_{pre}$ are width and height of a Kalman prediction area, $w_{frame}$, and $h_{frame}$ are width and height of the video frame, $v_w$ and $v_h$ are Kalman average moving speeds in transverse and longitudinal directions of the target in a previous n frame image, a is a constant that controls an area expanding speed, and t is a video frame number counted from start of tracking loss.

2. A landing tracking control system, the system comprising a tracking model and a real-time tracking apparatus, wherein the tracking model comprises:

a lightweight SNet feature module for facilitating a search feature pattern and a target feature pattern of the lightweight network SNet;

a feature weight adjusting module for adjusting weights of the search feature pattern and the target feature pattern to obtain an adjusted search feature pattern and an adjusted target feature pattern;

an enhanced feature module for carrying out a feature enhancing operation on the adjusted search feature pattern and the adjusted target feature pattern to obtain an enhanced search feature pattern and an enhanced target feature pattern;

an RPN module configured with an RPN network, for determining a type and a position of the target; and a CIOU loss module for measuring a regression precision of the target frame; and the real-time tracking apparatus comprises:

a camera carried by the unmanned aerial vehicle for shooting a video of the camera carried by the unmanned aerial vehicle;

a video identifying module for carrying out frame identifying operation on the camera carried by the unmanned aerial vehicle;

a tracking identifying module, configured with a control software for the landing tracking control method of the unmanned aerial vehicle as claimed in claim 1;

a judging module for judging whether the target is positioned successfully or not;

a prediction searching module for carrying out prediction search on the target by using Kalman algorithm when the judging module judges that the target is positioned successfully; and a search expanding module for adjusting a search expanding scope when the judging module judges that the target is not positioned successfully.

3. An unmanned aerial vehicle, applying the landing tracking control system as claimed in claim 2.

* * * * *